(12) United States Patent
Takaira

(10) Patent No.: US 8,622,164 B2
(45) Date of Patent: Jan. 7, 2014

(54) CONTROL APPARATUS FOR FOUR-WHEEL DRIVE VEHICLE, FOUR-WHEEL DRIVE VEHICLE, AND CONTROL METHOD

(75) Inventor: Koji Takaira, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 197 days.

(21) Appl. No.: 13/104,068

(22) Filed: May 10, 2011

(65) Prior Publication Data

US 2011/0271781 A1 Nov. 10, 2011

(30) Foreign Application Priority Data

May 10, 2010 (JP) ................................. 2010-108797

(51) Int. Cl.
*B60K 17/354* (2006.01)
(52) U.S. Cl.
USPC ............................ 180/247; 180/246; 180/233
(58) Field of Classification Search
USPC ......................................... 180/247, 246, 233
See application file for complete search history.

(56) References Cited

U.S. PATENT DOCUMENTS

| 5,802,489 A * | 9/1998 | Orbach et al. ................... 701/50 |
| 7,793,749 B2 * | 9/2010 | Baasch et al. ................. 180/247 |
| 7,806,220 B2 * | 10/2010 | Sharma et al. ................ 180/247 |
| 8,042,642 B2 * | 10/2011 | Marsh et al. .................. 180/247 |

FOREIGN PATENT DOCUMENTS

| JP | 11157355 A | 6/1999 |
| JP | 11157356 A | 6/1999 |
| JP | 11189065 A | 7/1999 |

* cited by examiner

*Primary Examiner* — Tashiana Adams
*Assistant Examiner* — Marlon Arce
(74) *Attorney, Agent, or Firm* — Gifford, Krass, Sprinkle, Anderson & Citkowski, P.C.

(57) ABSTRACT

When a count value concerning with the travel of the vehicle in a two-wheel drive state reaches or exceeds a predetermined value, the state of drive in a transfer is temporarily switched to a four-wheel drive state by connecting a synchromesh mechanism while keeping a mesh clutch disconnected, so that rotary members that do not rotate during the two-wheel drive state, such as a second output shaft, are temporarily rotated. Thus, the rotary members are restrained from remaining in contact at fixed portions and therefore being partially worn. Besides, there is no need to provide a mechanism for temporarily rotating the rotary members, such as the second output shaft, separately from the synchromesh mechanism that is normally provided for the four-wheel drive travel in the related art. Therefore, it is possible to improve durability without involving cost increase, space efficiency deterioration, etc.

9 Claims, 5 Drawing Sheets

CONTROL APPARATUS FOR FOUR-WHEEL DRIVE VEHICLE, FOUR-WHEEL DRIVE VEHICLE, AND CONTROL METHOD

CROSS-REFERENCE TO RELATED APPLICATIONS

This application claims priority to Japanese Patent Application No. 2010-108797 filed on May 10, 2010 which is incorporated herein by reference in its entirety including the specification, drawings and abstract.

BACKGROUND OF THE INVENTION

1. Field of the Invention

The invention relates to a control apparatus for a four-wheel drive vehicle, a four-wheel drive vehicle, and a control method for a four-wheel drive vehicle that are capable of switching between a two-wheel drive state and a four-wheel drive state.

2. Description of the Related Art

A four-wheel drive vehicle capable of switching between a two-wheel drive state in which the vehicle travels by transmitting power only to main driving wheels and a four-wheel drive state in which the vehicle travels by transmitting power both to the main driving wheels and to auxiliary driving wheels is well known. Examples of such a vehicle include those described in Japanese Patent Application Publication No. 11-189065 (JP-A-11-189065), Japanese Patent Application Publication No. 11-157355 (JP-A-11-157355), and Japanese Patent Application Publication No. 11-157356 (JP-A-11-157356). The 4WD vehicles described in Japanese Patent Application Publication No. 11-189065 (JP-A-11-189065), Japanese Patent Application Publication No. 11-157355 (JP-A-11-157355), and Japanese Patent Application Publication No. 11-157356 (JP-A-11-157356), in particular, are constructed so that, for example, when the 2WD mode is selected, the auxiliary driving wheels that act as driven wheels during the four-wheel drive state are disconnected from a power transmission path to the auxiliary driving wheels, so that the rotary members of the power transmission path are stopped from rotating. That is, these vehicles are constructed so that during the 2WD mode, power is not transmitted to the power transmission path that is provided for the auxiliary driving wheels and, furthermore, the rotary members of the power transmission path are not rotated together with rotation of the auxiliary driving wheels that act as driven wheels during the two-wheel drive state.

However, in a construction in which there is a rotary member that stops rotating when the two-wheel drive state is entered, the rotary member and a member that contacts the rotary member are always in contact with each other at fixed contact portions during a stop of rotation. Therefore, there may arise a risk of decline in durability due to progress of local striking wear or the like that is caused by input of vibration from outside, for example, rotating vibration from an engine or the like. Concretely, the contact between a shaft and a bearing, the contact between a chain and a gear (sprocket), etc. are conceivable. For example, in the contact between the shaft and the bearing, the rollers of the bearing have line contact at fixed portions with a contact surface (rolling surface portion) of the shaft, so that there is possibility of striking wear (fretting) or the like being caused on the fixed contact portions by input of vibration from outside. In particular, in the case where the lubricating performance of oil has declined due to stop of rotation, this problem may more conspicuously manifest itself.

With respect to this problem, the foregoing patent application No. 11-189065 proposes that a link mechanism that links a rotary member that stops rotating when the 2WD mode is selected and a rotary member of a power transmission path to the main driving wheels is provided separately from a mechanism for the 4WD travel, and when the 2WD mode has been selected, the link mechanism is actuated on the basis of elapse of a predetermined time interval or the like so as to rotate the rotary member that stops rotating when the 2WD mode is selected, without switching the mode of drive to the 4WD mode. Besides, the foregoing patent application also proposes as still another related-art technology that, for example, in order to secure oil lubrication, the amount of oil is increased to increase the portion that is dipped into the oil, or the configuration of the ribs in the housing case is adjusted, or holes through which the oil is allowed to enter are provided, or oil is actively fed by using an oil pump, among other arrangements. However, there is possibility of drawbacks of cost increase or space efficiency deterioration related to the measure of providing the foregoing link mechanism separately from the mechanism for the 4WD travel and the like, efficiency deterioration due to a large amount of time needed for evaluation regarding various adjustments and the like, increased stirring resistance resulting from increased amount of oil, etc. These problems are not yet known to public, and no proposal has been made regarding a technology that restrains the contact at fixed portions and appropriately secures oil lubrication during the two-wheel drive state without involving drawbacks of cost increase, efficiency deterioration, etc.

SUMMARY OF THE INVENTION

The invention provides a control apparatus for a four-wheel drive vehicle, a four-wheel drive vehicle, and a control method for a four-wheel drive vehicle that are able to improve durability by restraining partial wear of a rotary member that stops rotating when the two-wheel drive state is entered.

A first aspect of the invention relates to (a) a control apparatus for a four-wheel drive vehicle that is capable of switching a state of drive between a two-wheel drive state in which the vehicle travels by transmitting power transmitted by a drive force source only from a main drive shaft to main driving wheels and a four-wheel drive state in which the vehicle travels by transmitting the power to the main driving wheels, and also by transmitting the power from the main drive shaft to an auxiliary drive shaft through putting into a connected state a first power connection/disconnection device capable of connecting and disconnecting a power transmission path between the main drive shaft and the auxiliary drive shaft, and by transmitting the power from the auxiliary drive shaft to auxiliary driving wheels through putting into the connected state a second power connection/disconnection device capable of connecting and disconnecting a power transmission path between the auxiliary drive shaft and the auxiliary driving wheels, wherein (b) when the state of drive is switched to the two-wheel drive state, both the first power connection/disconnection device and the second power connection/disconnection device are put into a disconnected state, and (c) when a count value concerning a travel of the vehicle in the two-wheel drive state becomes equal to or greater than a predetermined value, the state of drive is temporarily switched to the four-wheel drive state by putting one of the first power connection/disconnection device and the second power connection/disconnection device into the connected state.

According to the first aspect of the invention, for example, when the count value concerning the travel in the two-wheel drive state becomes equal to or greater than the predetermined value, the state of drive is temporarily switched to the four-wheel drive state as one of the first power connection/disconnection device and the second power connection/disconnection device is put into the connected state. Therefore, for example, the rotary members that do not rotate during the two-wheel drive state, such as the auxiliary drive shaft and the like, are temporarily rotated, so that the contact of the rotary members at fixed portions is restrained. Hence, the partial wear of the rotary members that do not rotate during the two-wheel drive state is restrained, so that durability can be improved.

Besides, since there is no need to provide a mechanism for temporarily rotating the rotary members, such as the auxiliary drive shaft and the like, separately from the mechanisms that are normally provided for the travel in the four-wheel drive state (e.g., the first power connection/disconnection device and the second power connection/disconnection device), it is possible to improve durability without involving drawbacks of cost increase, space efficiency deterioration, etc.

Besides, for example, with a construction in which the oil gathering in a lower portion of a case is splashed upward by rotation of rotary members, such as the auxiliary drive shaft and the like, the oil is splashed upward by rotating the rotary members such as the auxiliary drive shaft and the like. Therefore, oil lubrication can be appropriately secured for the rotary members that do not rotate during the two-wheel drive state, so that the partial wear of the rotary members can be further restrained and the durability can be further improved. In this case, since it is not necessary to increase the amount of oil, it is possible to improve the durability without involving drawbacks of efficiency deterioration due to an increase in the amount of oil and the like. It should be apparent that, whether the construction in which the oil is splashed upward is adopted, since the rotary members that do not rotate during the two-wheel drive state, such as the auxiliary drive shaft and the like, are temporarily rotated, the contact of the rotary members at fixed portions is restrained, so that the control apparatus restrains partial wear of the rotary members that do not rotate during the two-wheel drive state.

Furthermore, if the connected state of one of the first power connection/disconnection device and the second power connection/disconnection device is maintained although the state of drive is switched to the four-wheel drive state, the vehicle as a whole remains in the two-wheel drive state in effect, so that efficiency deterioration can be restrained and changes in the vehicle behavior caused by the switching to the four-wheel drive state in effect can also be avoided.

Besides, the four-wheel drive vehicle may have a construction in which an oil for lubrication is splashed upward by rotation of the auxiliary drive shaft, and the power that is transmitted to the auxiliary drive shaft when the state of drive is temporarily switched to the four-wheel drive state may be smaller than the power for splashing the oil upward by rotation of the auxiliary drive shaft. With this construction, it is possible to restrain the efficiency deterioration resulting from the splashing up of the oil for lubrication due to rotation of the auxiliary drive shaft while restraining the partial wear of the rotary members that do not rotate, for example, during the two-wheel drive state.

Besides, when the count value concerning the travel in the two-wheel drive state becomes equal to or greater than a predetermined value, the state of drive may be temporarily switched to the four-wheel drive state by putting the first power connection/disconnection device into the connected state while maintaining the disconnected state of the second power connection/disconnection device. With this construction, for example, because only the first power connection/disconnection device is put into the connected state, the rotary members that do not rotate during the two-wheel drive state, such as the auxiliary drive shaft and the like, are certainly rotated without transmitting power to the auxiliary driving wheels.

Besides, the first power connection/disconnection device may be a power connection/disconnection device that includes a synchromesh mechanism, and the second power connection/disconnection device may be a power connection/disconnection device that does not include a synchromesh mechanism. With this construction, for example, in a four-wheel drive vehicle in which the second power connection/disconnection device is not equipped with a synchromesh mechanism and therefore it is difficult to rotate the auxiliary drive shaft from the side of the auxiliary driving wheels through the driving connection therewith by putting only the second power connection/disconnection device into the connected state during the travel of the vehicle, it is possible to improve durability by restraining the partial wear of the rotary members that do not rotate during the two-wheel drive state. Besides, since the second power connection/disconnection device is not equipped with a synchromesh mechanism, a simple mechanism is sufficient to construct the second power connection/disconnection device, achieving further improvements in cost cut, space efficiency, etc.

Besides, the count value concerning the travel in the two-wheel drive state may be a cumulative travel time in the two-wheel drive state or a cumulative travel distance in the two-wheel drive state. With this construction, the state of drive can be temporarily switched to the four-wheel drive state at an appropriate timing (time) such that the rotary members that do not rotate, for example, during the two-wheel drive state, are restrained from remaining in contact at fixed portions.

Besides, the count value concerning the travel in the two-wheel drive state may be an accumulated value obtained when a value related to rotation speed of the drive force source is greater than or equal to a predetermined rotation speed. With this construction, in conjunction with the problem in which as the rotation vibration of the drive force source that is a source of vibration that causes the striking wear or the like increases with, for example, increases in the value related to the rotation speed of the drive force source, it becomes more likely that local striking wear and the like of rotary members that do not rotate during the two-wheel drive state will progress, it is possible to take a measure in which when the value related to the rotation speed of the drive force source is greater than or equal to the predetermined rotation speed and therefore the foregoing striking wear and the like are likely to progress, the state of drive is able to be temporarily switched to the four-wheel drive state in an appropriate manner, depending on the then accumulated value. In other words, because the switching to the four-wheel drive state is not carried out on the basis of an accumulated value obtained when the value related to the rotation speed of the drive force source is less than the predetermined value and therefore the progress of striking wear and the like is unlikely, it is possible to restrain the efficiency deterioration caused by the temporary switching to the four-wheel drive state.

Besides, the predetermined value may be reduced with increases in a value related to rotation speed of the drive force source. With this construction, in conjunction with the problem in which as the rotation vibration of the drive force source that is a source of vibration that causes the striking wear or the like increases with, for example, increases in the value related to the rotation speed of the drive force source, it becomes more likely that local striking wear and the like of rotary members that do not rotate during the two-wheel drive state will progress, it is possible to cause the temporary switch to the four-wheel drive state to be performed more readily the higher the value related to the rotation speed of the drive force source.

A second aspect of the invention relates to a four-wheel drive vehicle that is capable of switching a state of drive between a two-wheel drive state in which the vehicle travels by transmitting power provided by a drive force source only from a main drive shaft to main driving wheels and a four-wheel drive state in which the vehicle travels by transmitting the power to the main driving wheels, and also by transmitting the power from the main drive shaft to an auxiliary drive shaft through putting into a connected state a first power connection/disconnection device capable of connecting and disconnecting a power transmission path between the main drive shaft and the auxiliary drive shaft, and by transmitting the power from the auxiliary drive shaft to auxiliary driving wheels through putting into the connected state a second power connection/disconnection device capable of connecting and disconnecting a power transmission path between the auxiliary drive shaft and the auxiliary driving wheels, the four-wheel drive vehicle including:

a control apparatus that puts both the first power connection/disconnection device and the second power connection/disconnection device into a disconnected state when the state of drive is switched to the two-wheel drive state, that temporarily switches the state of drive to the four-wheel drive state by putting one of the first power connection/disconnection device and the second power connection/disconnection device into the connected state when a count value concerning a travel of the vehicle in the two-wheel drive state becomes equal to or greater than a predetermined value.

A third aspect of the invention relates to a control method for a four-wheel drive vehicle, the control method includes:

switching a state of drive between a two-wheel drive state in which the vehicle travels by transmitting power provided by a drive force source only from a main drive shaft to main driving wheels and a four-wheel drive state in which the vehicle travels by transmitting the power to the main driving wheels, and also by transmitting the power from the main drive shaft to an auxiliary drive shaft through putting into a connected state a first power connection/disconnection device capable of connecting and disconnecting a power transmission path between the main drive shaft and the auxiliary drive shaft, and by transmitting the power from the auxiliary drive shaft to auxiliary driving wheels through putting into the connected state a second power connection/disconnection device capable of connecting and disconnecting a power transmission path between the auxiliary drive shaft and the auxiliary driving wheels, wherein both the first power connection/disconnection device and the second power connection/disconnection device are put into a disconnected state when the state of drive is switched to the two-wheel drive state;

detecting a count value concerning a travel of the vehicle in the two-wheel drive state; and temporarily switching the state of drive to the four-wheel drive state by putting one of the first power connection/disconnection device and the second power connection/disconnection device into the connected state when the count value becomes equal to or greater than a predetermined value.

According to the second and third aspects of the invention, for example, when the count value concerning the travel in the two-wheel drive state becomes equal to or greater than the predetermined value, the state of drive is temporarily switched to the four-wheel drive state as one of the first power connection/disconnection device and the second power connection/disconnection device is put into the connected state. Therefore, the rotary members that do not rotate, for example, during the two-wheel drive state, such as the auxiliary drive shaft and the like, are temporarily rotated, so that the contact of the rotary members at fixed portions is restrained. Hence, the partial wear of the rotary members that do not rotate during the two-wheel drive state is restrained, so that durability can be improved.

BRIEF DESCRIPTION OF THE DRAWINGS

The features, advantages, and technical and industrial significance of this invention will be described below with reference to the accompanying drawings, in which like numerals denote like elements, and wherein.

DETAILED DESCRIPTION OF EMBODIMENTS

In this invention, a four-wheel drive vehicle has a vehicle power transmission apparatus in a motive power transmission path between a drive force source and main driving wheels. The drive force source is, for example, an internal combustion engine that produces motive power through combustion of fuel, such as a gasoline engine, a diesel engine, etc. However, the drive force source may also be a different prime mover, such as an electric motor or the like, either alone or in combination with an engine.

Preferably, the vehicle power transmission apparatus is constructed of a transmission alone, or of a torque converter and a transmission that has a plurality of gear speeds, or of a torque converter-equipped transmission and a transfer, a speed reduction mechanism portion or a differential mechanism portion. This transmission includes: a planetary gear-type automatic transmission of any one of various kinds that selectively achieves one of a plurality of gear speeds (transmission ratio step) by selectively linking rotating elements of a plurality of planetary gear devices, for example, a planetary gear-type automatic transmission of four forward speeds, five forward speeds, six forward speeds, or more forward speeds; a synchronous mesh-type parallel two-shaft transmission that includes plural pairs of speed change gears on two shafts and that selectively puts one of the pairs of speed change gears into a power transmission state by using a synchronous device; a synchronous mesh-type parallel two-shaft automatic transmission that is a kind of synchronous mesh-type parallel two-shaft transmission that is capable of automatically, switching the transmission ratio step by using a synchronous device that is driven by a hydraulic actuator; a generally termed DCT (dual clutch transmission) that is a kind of synchronous mesh-type parallel two-shaft automatic transmission that has two input shaft systems in whose input shafts are connected with their respective clutches and with speed change gears of either odd or even-numbered speeds; a generally termed belt-type continuously variable transmission in which a drive belt that functions as a power transmission member is disposed around a pair of variable pulleys whose effective diameters are variable and the speed change ratio between the pulleys is steplessly changed; a generally termed traction-type continuously variable transmission in which a plurality of rollers are sandwiched between a pair of cones rotatable about a common axis so that the rollers are rotatable about their own axes that intersect with the common axis of the two cones, and the speed change ratio between the two cones is variable by changing the angle of intersection between the rotation axes of the rollers and the common axis of the cones; or the like.

Hereinafter, embodiments of the invention will be described in detail with reference to the drawings.

Figure 1:
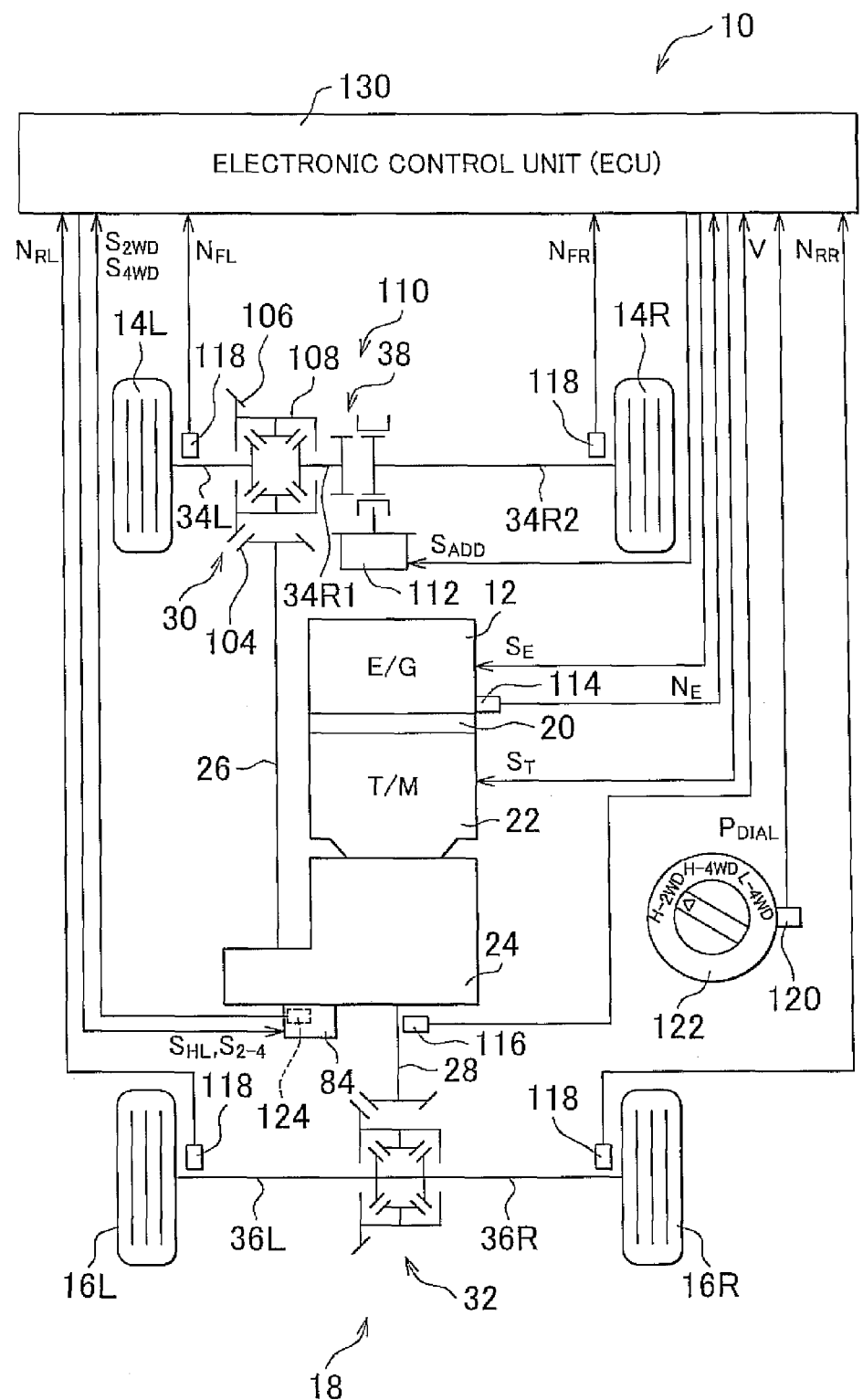
FIG. 1 is a diagram illustrating a construction of a vehicle to which the invention is applied, and is also a block diagram illustrating portions of a control system that is provided in the vehicle.

FIG. 1 is a diagram illustrating a construction of a vehicle 10 to which the invention is applied, and is also a block diagram illustrating portions of a control system that is provided in the vehicle 10. Referring to FIG. 1, the vehicle 10 is a four-wheel drive vehicle that moves basically as, for example, an FR (front mounted engine and rear wheel drive) type vehicle, and has a vehicle power transmission apparatus 18 that transmits power from an engine 12 as a vehicle-traction drive force source to a pair of left and right front wheels 14R and 14L (that will be referred to as "front wheels 14" when the left and right front wheels do not need to be distinguished from each other) provided as auxiliary driving wheels and to a pair of left and right rear wheels 16R and 16L (that will be referred to as "rear wheels 16" when the left and right rear wheels do not need to be distinguished from each other) provided as main driving wheels. The vehicle power transmission apparatus 18 includes: an automatic transmission 22 that has a torque converter 20 that is linked to the engine 12; a transfer (power distribution device) 24 that is linked to an output side of the automatic transmission 22 and that distributes the power received from the automatic transmission 22 to the side of the front wheels 14 and to the side of the rear wheels 16; a front propeller shaft 26 and a rear propeller shaft 28 that transmit the power distributed by the transfer 24 to the front wheel 14 side and the rear wheel 16 side; a front wheel differential gear device 30 and a rear wheel differential gear device 32 that are linked to the front propeller shaft 26 and the rear propeller shaft 28, respectively; a pair of left and right front wheel axles 34R (which includes 34R1 and 34R2) and 34L (that will be referred to as "front wheel axles 34" when the left and right front wheel axles do not need to be distinguished from each other) and a pair of left and right rear wheel axles 36R and 36L (that will be referred to as "rear wheel axles 36" when the left and right rear wheel axles do not need to be distinguished) that transmit the power transmitted via the front wheel differential gear device 30 and the rear wheel differential gear device 32, respectively, to the front wheels 14 and the rear wheels 16, respectively. In the vehicle power transmission apparatus 18 constructed as described above, the power generated by the engine 12 is transmitted to the two front wheels 14 and to the rear wheels 16 via their respective power transmission paths from the torque converter 20, the automatic transmission 22, the transfer 24, the front propeller shaft 26 or the rear propeller shaft 28, the front wheel differential gear device 30 or the rear wheel differential gear device 32, the left and right front wheel axles 34 or the left and right rear wheel axles 36, etc. Besides, in the front wheel differential gear device 30, a mesh clutch 38 as a generally termed ADD (automatic disconnecting differential) mechanism for switching the front wheel differential gear device 30 between a locked state and a free state is provided at the front wheel axle 34R side (i.e., between the front wheel differential gear device 30 and the front wheel 14R).

The engine 12 is an internal combustion engine, such as a gasoline engine, a diesel engine, etc., which generates drive force by combustion of fuel injected into the cylinders of the engine 12. Besides, the torque converter 20 is, for example, a fluid-type power transmission device that includes a pump impeller linked to a crankshaft of the engine 12, a turbine impeller linked to an input shaft of the automatic transmission 22, and a stator impeller fixed to a transmission case 40 (see FIG. 2) via a one-way clutch, and that transmits power via a fluid between the pump impeller and the turbine impeller. Besides, the automatic transmission 22 is, for example, a type of automatic transmission that includes a plurality of friction engagement elements, and that selectively establishes a plurality of speed change ratios according to combinations of engagement and disengagement of the friction engagement elements, and that outputs drive force after changing the speed of the drive force that is input through the input shaft.

The transfer 24, for example, selectively switches between cutoff (disconnection) and connection of power transmission between the rear propeller shaft 28 and the front propeller shaft 26 so as to transmit the power from the automatic transmission 22 to only the rear wheels 16, or to the front wheels 14 and the rear wheels 16. Besides, the transfer 24, for example, selectively establishes one of a high-speed-side gear speed (high-speed-side transmission ratio step) H and a low-speed-side gear speed (low-speed-side transmission ratio step) L, and also has a function as an auxiliary transmission that changes the speed of the power from the automatic transmission 22 and transmits it to a subsequent portion in the transmission path.

Figure 2:
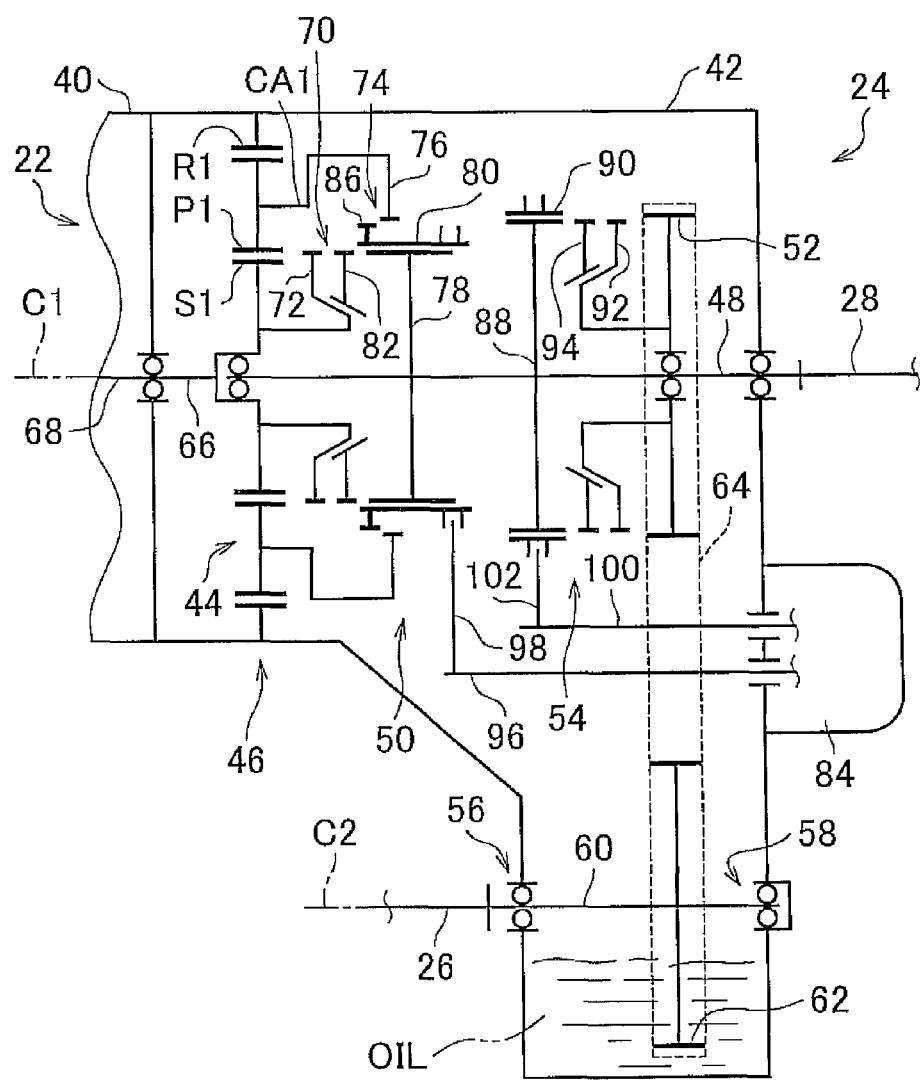
FIG. 2 is a skeleton diagram of a transfer provided in a vehicle power transmission apparatus shown in FIG. 1.

FIG. 2 is a skeleton diagram of the transfer 24. FIG. 2 is a developed diagram in which axes of an input shaft 66, a first output shaft 48, a second output shaft 60, a first shift fork shaft 96 and a second shift fork shaft 100 described below are shown in a common plane. In FIG. 2, the transfer 24 includes a transfer case 42 as a non-rotary member that is linked to a vehicle rear side of the transmission case 40 of the automatic transmission 22. Besides, in the transfer case 42, the transfer 24 has: an auxiliary transmission 46 composed mainly of a single-pinion type planetary gear device 44; the first output shaft 48 as a main drive shaft that is supported by the transfer case 42 so as to be rotatable about an axis C1 and that is linked to the rear propeller shaft 28; a mesh clutch device 50 that selectively establishes one of the low-speed-side gear speed L and the high-speed-side gear speed H as one of two power transmission paths from the auxiliary transmission 46 to the first output shaft 48 is put into a linked state; a drive gear 52 provided so as to be selectively switched between a permitted state and a prevented state regarding the rotation relative to the first output shaft 48 (the rear propeller shaft 28); and a synchromesh mechanism 54 that is a synchronous device (synchronous mesh mechanism) for switching the drive gear 52 between the permitted state and the prevented state regarding the rotation relative to the first output shaft 48. These components of the transfer 24 are provided on the axis C1. Besides, in the transfer case 42, the transfer 24 also has the second output shaft 60 as an auxiliary drive shaft that is supported by the transfer case 42 via bearings 56 and 58 so as to be rotatable about an axis C2 and that is linked to the front propeller shaft 26, and a driven gear 62 provided on the second output shaft 60 so as to be unrotatable relative to the second output shaft 60. These components of the transfer 24 are provided on the axis C2. The transfer 24 further includes a chain 64 that links the drive gear 52 and the driven gear 62.

The transfer 24 transmits rotation of the input shaft 66, which is supported by the transfer case 42 so as to be rotatable about the axis C1, to the first output shaft 48 via the auxiliary transmission 46. Furthermore, while the relative rotation of the drive gear 52 with respect to the first output shaft 48 is permitted, the power transmission from the first output shaft 48 to the second output shaft 60 is not performed (i.e., the power transmission path from the first output shaft 48 to the second output shaft 60 is cut off). On the other hand, while the relative rotation of the drive gear 52 to the first output shaft 48 is prevented, the power transmission from the first output shaft 48 to the second output shaft 60 is performed via the driven gear 52, the chain 64 and the driven gear 62 (i.e., the power transmission path from the first output shaft 48 to the second output shaft 60 is connected). The input shaft 66 is linked to an output shaft 68 of the automatic transmission 22, and is therefore rotated by drive force (torque) input from the engine 12 via the automatic transmission 22.

The planetary gear device 44 has a sun gear 81 that is linked to an outer peripheral surface of the input shaft 66 so as to be unrotatable about the axis C1 relative to the input shaft 6, a ring gear R1 that is arranged generally coaxially with the sun gear S1 and that is linked, unrotatably about the axis C1, to the transfer case 42 that is a fixed member that is fixed to a vehicle body; and a carrier CA1 that supports a plurality of pinions P1 that mesh with the sun gear S1 and the ring gear R1 so that the pinions P1 are rotatable about their own axes and revolvable around the sun gear S1. Therefore, the rotation speed of the sun gear S1 is equal to that of the input shaft 66, and the rotation speed of the carrier CA1 is reduced relative to that of the input shaft 66. Besides, a clutch gear 72 that is a non-synchronous-side member of a synchronous mesh mechanism 70 that participates in the establishment of the high-speed-side gear speed H is fixed so as to be unrotatable about the axis C1 relative to the sun gear S1. The synchronous mesh mechanism 70 is a portion of a mesh clutch device 50. Besides, a clutch gear 76 that is a non-synchronous-side member of a mesh clutch 74 of the mesh clutch device 50 which participates in the establishment of the low-speed-side gear speed L is fixed so as to be unrotatable about the axis C1 relative to the carrier CA1.

The mesh clutch device 50 includes the synchronous mesh mechanism 70 for establishing the high-speed-side gear speed H, and the mesh clutch 74 for establishing, the low-speed-side gear speed L. The synchronous mesh mechanism 70 is a so-called synchromesh mechanism that is well known, and, for example, has: a clutch hub 78 that is spline-fitted to the first output shaft 48 so as to be relatively unrotatable about the axis C1 with respect to the first output shaft 48; a cylindrical sleeve 80 that is spline-fitted to the clutch hub 78 so as to be relatively unrotatable about the axis C1 and relatively slidable in the direction along the axis C1 with respect to the clutch hub 78; the clutch gear 72 that has outer peripheral teeth that are relatively unrotatable about the axis C1 but relatively slidable in the direction along the axis C1 with respect to inner peripheral teeth of an inner peripheral surface of the sleeve 80 and that is disposed between the planetary gear device 44 and the clutch hub 78 and is fixed to the sun gear S1 as described above; and a synchronizer ring (synchronous ring) 82 that prevents the sleeve 80 from moving toward the clutch gear 72 while the rotation of the sleeve 80 and the rotation of the clutch gear 72 are in an asynchronous state. In this embodiment, the synchronizer ring 82 functions as a synchronous device that synchronizes the sleeve 80 and the clutch gear 72 when the sleeve 80 and the clutch gear 72 are about to be meshed with each other. The sleeve 80 corresponds to a shift ring that is moved in the direction along the axis C1 by a shift actuator 84. The mesh clutch 74 includes the sleeve 80 and the clutch gear 76 that has inner peripheral teeth which are relatively unrotatable about the axis C1 and relatively slidable in the direction along the axis C1 with respect to outer peripheral teeth 86 provided in an outer peripheral portion of the sleeve 80, and that is disposed at an opposite side of the outer peripheral teeth 86 to the clutch gear 72 and is fixed to the carrier CA1 as described above. In the mesh clutch device 50 constructed as described above, the sleeve 80 slides in the direction along the axis C1 to mesh with the clutch gear 72 so that the auxiliary transmission 46 establishes the high-speed-side gear speed H, and the sleeve 80 slides in the direction along the axis C1 to mesh with the clutch gear 76 so that the auxiliary transmission 46 establishes the low-speed-side gear speed L. At this time, the path that transmits power to the first output shaft 48 via the carrier CA1 and the clutch gear 76 corresponds to a power transmission path that establishes the low-speed-side gear speed L, and the path that transmits power to the first output shaft 48 via the sun gear S1 and the clutch gear 72 corresponds to a power transmission path that establishes the high-speed-side gear speed H. Besides, the transfer 24 assumes a power transmission cut-off state (neutral state) when the sleeve 80 does not mesh with either one of the clutch gears 72 and 76 as shown in, for example, FIG. 2. When the gear speed is switched between the high-speed-side gear speed H and the low-speed-side gear speed L, the switching is performed via the power transfer cut-off state.

The synchromesh mechanism 54 is, for example, a known synchromesh mechanism, and has: a clutch hub 88 that is spline-fitted to the first output shaft 48 so as to be relatively unrotatable about the axis C1 with respect to the first output shaft 48; a cylindrical sleeve 90 that is spline-fitted to the clutch hub 88 so as to be relatively unrotatable about the axis C1 and relatively slidable in the direction along the axis C1 with respect to the clutch hub 88; a clutch gear 92 which has outer peripheral teeth that mesh with inner peripheral teeth of an inner peripheral surface of the sleeve 90 so as to be relatively unrotatable about the axis C1 and relatively slidable in the direction along the axis C1 with respect to the inner peripheral teeth of the sleeve 90, and which is disposed between the drive gear 52 and the clutch hub 88 and is fixed to the drive gear 52; and a synchronizer ring 94 that prevents the sleeve 90 from moving toward the clutch gear 92 when the rotation of the sleeve 90 and the rotation of the clutch gear 92 are asynchronous. In this embodiment, the synchronizer ring 94 functions as a synchronous device that synchronizes the sleeve 90 and the clutch gear 92 when the sleeve 90 and the clutch gear 92 are about to be meshed with each other. The sleeve 90 corresponds to a shift ring that is moved in the direction along the axis C1 by the shift actuator 84. The sleeve 90 is usually positioned at a neutral position at which the sleeve 90 assumes a state of cutting off the power transmission as shown in FIG. 2, but is able to be slid and moved in the direction along the axis C1 by the shift actuator 84 to a transmission position at which the power transmission is possible. In the synchromesh mechanism 54 constructed as described above, the sleeve 90 is positioned, for example, at a position relative to the clutch hub 88 as shown in FIG. 2, when the shift actuator 84 that moves the sleeve 90 is not driven. When the sleeve 90 is at this relative position, the drive gear 52 is relatively rotatable about the axis C1 with respect to the first output shaft 48, and the drive gear 52 is rotated freely relative to the first output shaft 48, so that the power transmission to the second output shaft 60 side via the drive gear 52 is not performed (cut off). On the other hand, when the shift actuator 84 is driven to move the sleeve 90 to the drive gear 52 side until the sleeve 90 meshes with the clutch gear 92 and therefore a synchronizing operation of the synchromesh mechanism 54 is completed, the relative rotation of the drive gear 52 about the axis C1 with respect to the first output shaft 48 is prevented, and the drive gear 52 is rotated integrally with the first output shaft 48, so that the power transmission to the second output shaft 60 side via the drive gear 52, the chain 64, the driven gear 62, etc. is performed (connected). Thus, the synchromesh mechanism 54 functions as a first power connecting/disconnecting device that is able to connect and disconnect the power transmission path between the first output shaft 48 and the second output shaft 60.

The mesh clutch device 50 is constructed so that as the first shift fork shaft 96 that corresponds to an output member of the shift actuator 84 and that is thrust in the direction parallel to the axis C1 is moved in the direction parallel to the axis C1 by driving the shift actuator 84, the sleeve 80 is moved in the direction along the axis C1 via a first shift fork 98 that is fixed to the first shift fork shaft 96 so as to be engageable with the sleeve 80 in the direction along the axis C1 and relatively rotatable about the axis C1 with respect to the sleeve 80. Besides, the synchromesh mechanism 54 is constructed so that as the second shift fork shaft 100 that corresponds to an output member of the shift actuator 84 and that is thrust in the direction parallel to the axis C1 is moved in the direction parallel to the axis C1 by driving the shift actuator 84, the sleeve 90 is moved in the direction along the axis C1 via a second shift fork 102 that is fixed to the second shift fork shaft 100 so as to be engageable with the sleeve 90 in the direction along the axis C1 and relatively rotatable about the axis C1 with respect to the sleeve 90.

Referring back to FIG. 1, the motive power distributed to the second output shaft 60 by the transfer 24 is input to the front wheel differential gear device 30 via the front propeller shaft 26. An end portion of the front propeller shaft 26 is provided with a drive pinion 104 that is a bevel gear. The gear teeth of the drive pinion 104 are constructed so as to fit to the teeth of a ring gear 106 that is a bevel gear of the front wheel differential gear device 30. This ring gear 106 is fixed to a differential case 108, and rotates (revolves) integrally with the differential case 108 about an axis of the front axles 34. The front wheel axles 34 include front wheel axles 34R and 34L on an axis, and the front wheel axle 34R includes front wheel axles 34R1 and 34R2. As described above, the front wheel differential gear device 30 is a differential gear device that is provided with the mesh clutch 38 as an ADD mechanism.

The mesh clutch 38 switches between a power transmission state in which power is transmitted between the front wheel axle 34R1 and the front wheel axle 34R2 and a power cutoff state in which the power transmission is cut off. That is, the mesh clutch 38 is made up of, for example, a known dog clutch or the like that selectively links the front wheel axle 34R1 and the front wheel axle 34R2 to each other, and functions as a second power connection/disconnection device that selectively switches between disconnection and connection of the power transmission between the front wheel differential gear device 30 and the front wheel 14R. That is, the mesh clutch 38, when in the released state (disconnected state), cuts off the power transmission path between the front wheel differential gear device 30 and the front wheels 14R, and, when in the connected state, connects the power transmission path between the front wheel differential gear device 30 and the front wheel 14R. The mesh clutch 38, for example, during the two-wheel drive state, is put into the disconnected state, cutting off the power transmission path between the front wheel differential gear device 30 and the front wheel 14R.

Concretely, the ADD device 110 includes the mesh clutch 38 and an electric motor 112 for switching the state of operation of the mesh clutch 38 (i.e. between the connected state and the disconnected state). The ADD device 110 is able to selectively switch the mesh clutch 38 between the connected state and the disconnected state by driving the motor 112 and thereby switch between the power transmission state in which the front wheel axle 34R1 and the front wheel axle 34R2 are meshed and the power cutoff state in which the front wheel axles 34R1 and the 34R2 are not meshed.

When the ADD device 110 establishes the power transmission state in which power can be transmitted between the front wheel axle 34R1 and the front wheel axle 34R2, the power (drive force) generated by the engine 12 and distributed by the transfer 24 is transmitted to the front wheel differential gear device 30 via the front propeller shaft 26, and then is transmitted to the left and right front wheels 14 via the left and right front wheel axles 34. At this time, the rest of the drive force, that is, the amount of drive force other than the amount of drive force that is distributed to the front wheels 14 by the transfer 24 whose synchromesh mechanism 54 is in the connected state, is transmitted to the left and right rear wheels 16 via the rear propeller shaft 28, the rear wheel differential gear device 32 and the left and right rear wheel axles 36. Thus, the vehicle 10 is in a front-and-rear wheel drive state (four-wheel drive state).

On the other hand, when the synchromesh mechanism 54 is put into the disconnected state, the power from the engine 12 is transmitted only to the left and right rear wheels 16 by the transfer 24, so that the vehicle 10 is in a rear wheel drive state (two-wheel drive state). At this time, if the ADD device 110 is in the power transmission state in which power can be transmitted between the front wheel axle 34R1 and the front wheel axle 34R2, rotation of the left and right front wheels 14 rotate the front wheel axles 34, the front wheel differential gear device 30, the front propeller shaft 26, the second output shaft 60, the driven gear 62, the chain 64, the drive gear 52, etc. In that case, torque acts in the deceleration direction for the vehicle 10, and efficiency declines. Therefore, in the vehicle 10 in this embodiment, for example, in association with the two-wheel drive state, the mesh clutch 38 is disconnected to bring about the power cutoff state in which the ADD device 110 does not transmit power between the front wheel axle 34R1 and the front wheel axle 34R2.

Thus, the vehicle 10 is a four-wheel drive vehicle that adopts a part-time 4WD system capable of selectively switching between the two-wheel drive state in which both the synchromesh mechanism 54 capable of connecting and disconnecting the power transmission path between the first output shaft 48 and the second output shaft 60 and the mesh clutch 38 capable of connecting and disconnecting the power transmission path between the second output shaft 60 and the front wheels 14 are put into the disconnected state and therefore power from the engine is transmitted from the first output shaft 48 only to the rear wheels 16, and the four-wheel drive state in which power from the engine 12 is transmitted to the rear wheels 16 and, in addition, power from the engine 12 is also transmitted from the first output shaft 48 to the second output shaft 60 by putting the synchromesh mechanism 54 into the connected state, and then is transmitted from the second output shaft 60 to the front wheels 14 by putting the mesh clutch 38 into the connected state.

Besides, as shown in FIG. 1, the vehicle 10 is equipped with, for example, an electronic control unit 130 that includes a four-wheel drive vehicle control apparatus for switching between the two-wheel drive state and the four-wheel drive state. The electronic control unit 130 includes, for example, a so-called microcomputer that includes a CPU, a RAM, a ROM, input/output interfaces, etc. The CPU performs an output control of the engine 12, a gear ratio shift control of the automatic transmission 22, a switching control of the synchromesh mechanism 54 of the transfer 24 and the mesh clutch 38 of the front wheel differential gear device 30, etc. by performing signal processing according to programs that are stored beforehand in the ROM and utilizing the temporary storage function of the RAM.

The electronic control unit 130 is supplied with various signals, for example, a signal that represents the engine rotation speed $N_E$ detected by an engine rotation speed sensor 114, a signal that represents a vehicle speed V that corresponds to the output rotation speed $N_{RP}$ of the rear propeller shaft 28 that is detected by a rear propeller rotation speed sensor 116, signals that represent wheel speeds $N_{FR}$, $N_{FL}$, $N_{RR}$ and $N_{RL}$ that correspond to the rotation speeds $N_W$ of the individual wheels (i.e., the front wheels 14R and 14L and the rear wheels 16R and 16L) that are detected by wheel speed sensors 118, a signal that represents the operation position $P_{DIAL}$ of a drive state-switching dial switch 122 that is detected by a dial position sensor 120, signals that represent the two-wheel drive state $S_{2WD}$ and the four-wheel drive state $S_{4WD}$, respectively, that are detected by a drive state-detecting switch 124 and that indicate that the switching of the synchromesh mechanism 54 in the transfer 24 has been completed, etc.

Besides, the electronic control unit 130 outputs, for example, an engine output control command signal $S_E$ for an output control of the engine 12, a ratio shift control command signal $S_T$ for a ratio shift control of the automatic transmission 22, a high/low switching control command signal $S_{HL}$ for switching the gear speed of the auxiliary transmission 46 between the high-speed-side gear speed H and the low-speed-side gear speed L by causing the shift actuator 84 to actuate the mesh clutch device 50 via the first shift fork shaft 96, a drive state-switching control command signal $S_{2-4}$ for switching the state of drive in the transfer 24 between the two-wheel drive state and the four-wheel drive state by causing the shift actuator 84 to actuate the synchromesh mechanism 54 via the second shift fork shaft 100, an ADD switching control command signal $S_{ADD}$ for switching the power transmission path extending between the front wheel differential gear device 30 and the front wheel 14R between the disconnected state and the connected state by causing the electric motor 112 to actuate the mesh clutch 38.

The drive state-switching dial switch 122 is a dial-type switch that is provided, for example, near the driver's seat, and that is manually operated by a user. The drive state-switching dial switch 122 has three operation positions $P_{DIAL}$ for commanding the switching to the two-wheel drive state (H-2WD) combined with the high-speed-side gear speed H, the four-wheel drive state (H-4WD) combined with the high-speed-side gear speed H, or the four-wheel drive state (L-4WD) combined with the low-speed-side gear speed L. This drive state-switching dial switch 122 is not limited to a dial type switch as described above, but this switching function may also be realized by employing, for example, a slide type switch, a seesaw type switch, or the like.

Figure 3:
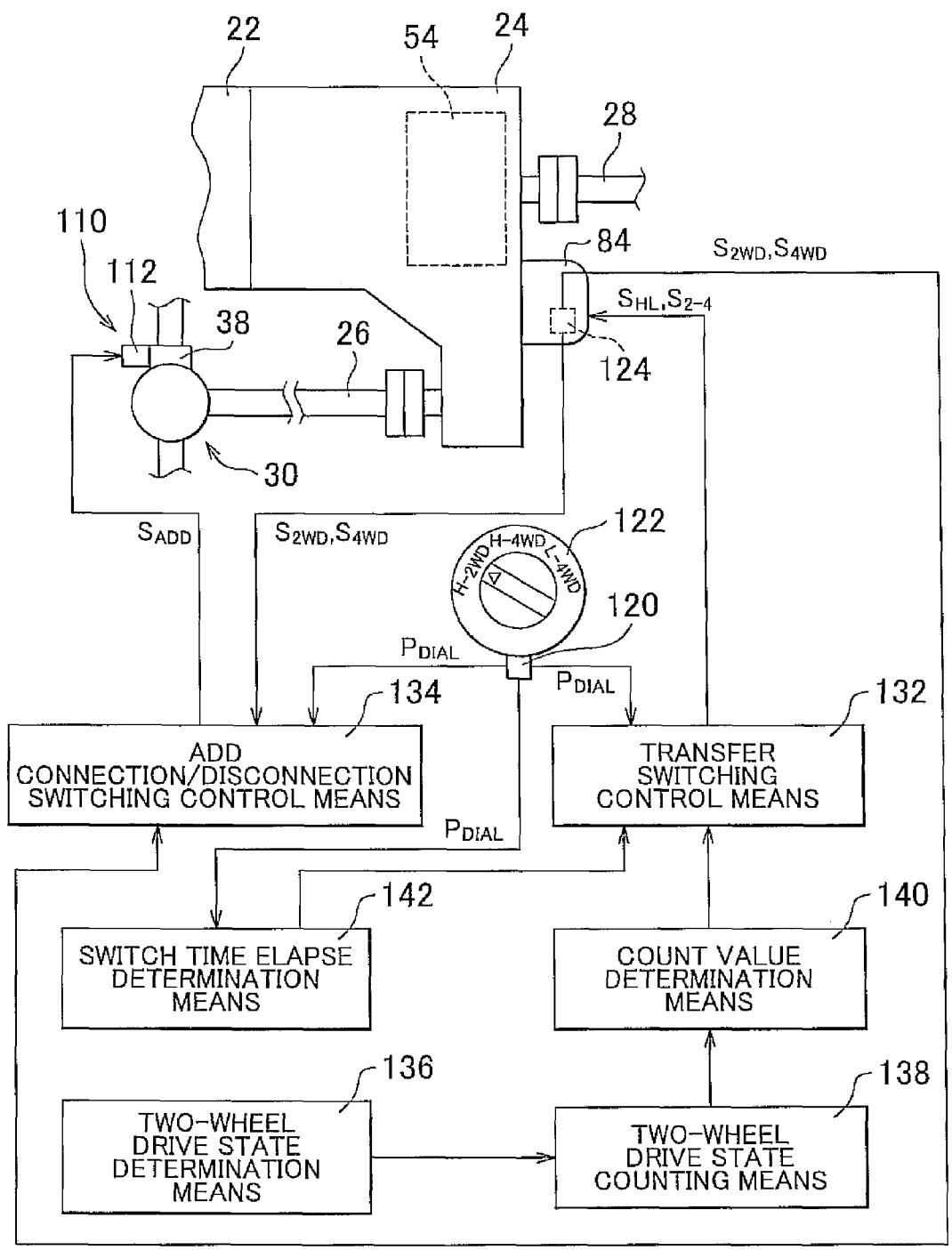
FIG. 3 is a functional block diagram illustrating portions of control functions performed by an electronic control unit shown in FIG. 1.

FIG. 3 is a functional block diagram illustrating portions of control functions performed by the electronic control unit 130. In FIG. 3, a transfer switching control portion, that is, transfer switching control means 132, controls the switching of the transfer 24 on the basis of, for example, signals that represent the operation positions $P_{DIAL}$ of the drive state-switching dial switch 122. Concretely, when the selected operation position $P_{DIAL}$ of the drive state-switching dial switch 122 is such that usually a signal representing the two-wheel drive state (H-2WD) is generated, the transfer switching control means 132 outputs a high/low switching control command signal $S_{HL}$ for switching the gear speed of the auxiliary transmission 46 to the high-speed-side gear speed H to the shift actuator 84, so that the shift actuator 84 switches the gear speed of the auxiliary transmission 46 to the high-speed-side gear speed H by accordingly actuating the mesh clutch device 50 via the first shift fork shaft 96. Furthermore, the transfer switching control means 132 also outputs to the shift actuator 84 a drive state-switching control command signal $S_{2-4}$ for switching the state of drive in the transfer 24 to the two-wheel drive state, so that the shift actuator 84 disconnects the synchromesh mechanism 54 via the second shift fork shaft 100. On another hand, when the operation position $P_{DIAL}$ is such that usually a signal representing the four-wheel drive state (H-4WD) is generated, the transfer switching control means 132 outputs to the shift actuator 84 the high/low switching control command signal $S_{HL}$ for switching the gear speed of the auxiliary transmission 46 to the high-speed-side gear speed H, as in the foregoing case of the two-wheel drive state (H-2WD). Furthermore, the transfer switching control means 132 outputs to the shift actuator 84 a drive state-switching control command signal $S_{2-4}$ for switching the state of drive of the transfer 24 to the four-wheel drive state, so that the shift actuator 84 connects the synchromesh mechanism 54 via the second shift fork shaft 100. On the other hand, when the operation position $P_{DIAL}$ is such that usually a signal representing the four-wheel drive state (L-4WD) is generated, the transfer switching control means 132 outputs to the shift actuator 84 a high/low switching control command signal $S_{HL}$ for switching the gear speed of the auxiliary transmission 46 to the low-speed-side gear speed L, so that the shift actuator 84 switches the gear speed of the auxiliary transmission 46 to the low-speed-side gear speed L by actuating the mesh clutch device 50 via the first shift fork shaft 96. Furthermore, the transfer switching control means 132 outputs to the shift actuator 84 the drive state-switching control command signal $S_{2-4}$ for switching the state of drive in the transfer 24 to the four-wheel drive state, as in the case of the foregoing four-wheel drive state (H-4WD).

An ADD connection/disconnection switching control portion, that is, ADD connection/disconnection switching control means 134, controls the switching of the mesh clutch 38 on the basis of, for example, the signals that represent the operation positions $P_{DIAL}$ of the drive state-switching dial switch 122. Concretely, when the selected operation position $P_{DIAL}$ is such that usually the signal representing the two-wheel drive state (H-2WD) is generated, the ADD connection/disconnection switching control means 134 outputs to the motor 112 an ADD switching control command signal $S_{ADD}$ for cutting off the power transmission path between the front wheel differential gear device 30 and the front wheel 14R, so that the motor 112 is operated to disconnect the mesh clutch 38. When the operation position $P_{DIAL}$ is such that usually the signal representing one of the four-wheel drive state (H-4WD) and the four-wheel drive state (L-4WD) is generated, the ADD connection/disconnection switching control means 134 outputs to the motor 112 an ADD switching control command signal $S_{ADD}$ for connecting the power transmission path between the front wheel differential gear device 30 and the front wheel 14R, so that the motor 112 is operated to connect the mesh clutch 38, on condition that the signal that shows that the switching of the synchromesh mechanism 54 in the transfer 24 has been completed is a signal that represents the four-wheel drive state $S_{4WD}$.

In this embodiment, for example, when the driver has selected the two-wheel drive state (H-2WD) by the drive state-switching dial switch 122, both the synchromesh mechanism 54 and the mesh clutch 38 are put into the disconnected state. Therefore, while the two-wheel drive state (H-2WD) is selected, none of the drive gear 52, the driven gear 62, the chain 64, the second output shaft 60, the bearings 56 and 58, etc. is rotated by the first output shaft 48, and none of them is rotated by rotation of the front wheels 14. Thus, these components remain stopped during the two-wheel drive state. That is, during the stop of rotation, contact at fixed portions constantly exists, for example, between the drive gear 52 and the chain 64, between the driven gear 62 and the chain 64, and between the second output shaft 60 and the bearings 56 and 58, giving a risk of decline in durability due to local progress of striking wear or the like that is caused by input of vibration from outside, for example, rotating vibration from the engine 12 or the like. In particular, in the vehicle 10 in accordance with this embodiment, which is designed so that the oil OIL (see FIG. 2) gathering in a lower portion of the transfer case 42 is splashed upward by rotation of the driven gear 62 and the chain 64 in order to improve the lubricating performance, the problem of the foregoing decline in durability may more conspicuously manifest itself as the lubricating performance declines when the driven gear 62 and the chain 64 stop rotating.

Therefore, in order to temporarily rotate rotary members, such as the second output shaft 60 and the like, that normally do not rotate during the two-wheel drive state, the electronic control unit 130 in this embodiment temporarily switches the state of drive to the four-wheel drive state by connecting at least one of the synchromesh mechanism 54 and the mesh clutch 38, for example, when a count value CNT concerning the travel in the two-wheel drive state reaches a predetermined value CNT'. For example, when the count value CNT concerning the travel in the two-wheel drive state becomes equal to or greater than the predetermined value CNT', the electronic control unit 130 temporarily switches only one of the synchromesh mechanism 54 and the mesh clutch 38 to the connected state. It is to be noted herein that the mesh clutch 38 (ADD device 110) is a power connecting/disconnecting device that is not equipped with a synchromesh mechanism, and therefore it is difficult to switch the mesh clutch 38 to the connected state during a travel of the vehicle 10 during which the synchromesh mechanism 54 is not in the connected state. Therefore, in this embodiment, for example, when the count value CNT concerning the travel in the two-wheel drive state becomes equal to or greater than the predetermined value CNT', only the state of drive in the transfer 24 is temporarily switched to the four-wheel drive state by putting only the synchromesh mechanism 54 into the connected state, without switching the mesh clutch 38 (ADD device 110), that is, while keeping the mesh clutch 38 in the disconnected state.

Incidentally, the count value CNT concerning the travel in the two-wheel drive state is a count value that shows a cumulative travel time CNT-T or a cumulative travel distance CNT-D of the vehicle 10 during the two-wheel drive state that is obtained by counting time pulses of a constant frequency which have been set beforehand as reference pulses or by counting rotation pulses that have been set beforehand as reference pulses and that are detected from a rotary member that rotates as the vehicle 10 travels. As for the cumulative travel time CNT-T, it is permissible to avoid the counting of time, for example, during a temporary stop of the vehicle 10 in the two-wheel drive state, and to determine a cumulative travel time by summing the count values obtained before and after the temporary stop. Alternatively, it is also permissible to determine a cumulative travel time that includes the duration of a temporary stop of the vehicle 10 in the two-wheel drive state. That is, the vehicle travel time in this embodiment may include, for example, the duration of a vehicle state in which the engine 12 is operating while the vehicle 10 is at a stop. Besides, for example, as the engine rotation speed $N_E$ increases, the rotation vibration of the engine 12 that is a source of vibration that causes the striking wear or the like increases, so that the local striking wear or the like of rotary members that do not rotate during the two-wheel drive state, such as the second output shaft 60 and the like, becomes more likely to progress. Therefore, it is also permissible to adopt, for example, a construction in which the foregoing reference pulses are counted only when the engine rotation speed $N_E$ is greater than or equal to a predetermined rotation speed $N_E'$ while the vehicle 10 is traveling in the two-wheel drive state, and an accumulated value of the count values obtained when the engine rotation speed $N_E$ is greater than or equal to the rotation speed $N_E'$ is determined as a count value CNT concerning the travel of the vehicle 10 in the two-wheel drive state. The predetermined rotation speed $N_E'$ is a criterion value for determining whether or not the counting is necessary which is determined beforehand through experiments or the like as an engine rotation speed $N_E$ above which the local striking wear or the like of the rotary members that do not rotate during the two-wheel drive state, such as the second output shaft 60 and the like, is likely to progress. Although the condition that the engine rotation speed $N_E$ is greater than or equal to the predetermined rotation speed $N_E'$ is adopted as the condition for the counting in this embodiment, the condition for the counting may also be a condition that a value related to the engine rotation speed $N_E$, instead of the engine rotation speed $N_E$ itself, is greater than or equal to a predetermined engine rotation speed-related value. Examples of the value related to the engine rotation speed $N_E$ include the rotation speed of the output shaft 68 of the automatic transmission 22, the output rotation speed $N_{RP}$ of the rear propeller shaft 28, the vehicle speed V, the rotation speed $N_W$ of each wheel, etc.

Figure 4:
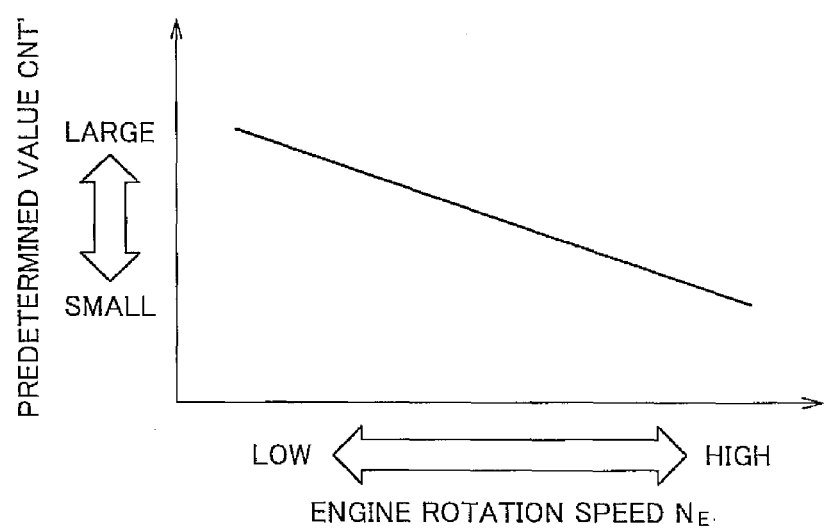
FIG. 4 is a diagram showing a relation (a predetermined-value map) in which the higher the engine rotation speed is, the smaller the predetermined value is made.

Besides, the predetermined value CNT' is a 4WD switching criterion threshold value that is found and set beforehand empirically or by design for use for determining whether or not a given count value CNT is such that it is necessary to temporarily switch the state of drive to the four-wheel drive state because the vehicle 10 has continually been in the two-wheel drive state so that a risk of decline in the durability of the rotary members that do not rotate during the two-wheel drive state, such as the second output shaft 60 and the like, is likely to arise. Besides, as the engine rotation speed $N_E$, for example, becomes higher, more rotation vibration is produced by the engine 12, which is a source of vibration that causes the striking wear or the like, so that local striking wear of rotary members that do not rotate during the two-wheel drive state, such as the second output shaft 60 or the like, becomes more likely to progress. Therefore, it is also permissible to adopt a construction in which the higher the engine rotation speed $N_E$ (or a value related to the engine rotation speed $N_E$) is, the smaller the predetermined value CNT' is made in order to facilitate the temporary switching to the four wheel drive. For example, the electronic control unit 130 calculates the predetermined value CNT' from an actual engine rotation speed $N_E$ on the basis of a relation in which the higher the engine rotation speed $N_E$, the smaller the predetermined value CNT', for example, a relation as shown in FIG. 4 (predetermined-value map). However, since the engine rotation speed $N_E$ is not constantly fixed during the travel of the vehicle in the two-wheel drive state, it is appropriate, for example, to serially calculate an average value of the engine rotation speed $N_E$ during the traveling of the vehicle in the two-wheel drive state and serially calculate a predetermined value CNT' on the basis of the average value of the engine rotation speed $N_E$.

Referring back to FIG. 3, a drive state determination portion, that is, drive state determination means 136, determines the present state of drive in the transfer 24, on the basis of, for example, signals representing the two-wheel drive state $S_{2WD}$ and the four-wheel drive state $S_{4WD}$, respectively, which are detected by the drive state-detecting switch 124.

A two-wheel drive state counting portion, that is, two-wheel drive state counting means 138, counts the reference pulses and serially outputs a count value CNT concerning the travel of the vehicle 10 in the two-wheel drive state, as long as it is determined by the drive state determination means 136 that the present state of drive in the transfer 24 is the two-wheel drive state. At this time, the two-wheel drive state counting means 138 may count the reference pulses, for example, only when the engine rotation speed $N_E$ is greater than or equal to the predetermined rotation speed $N_E'$. Besides, if it is determined by the drive state determination means 136 that the present state of drive in the transfer 24 is the four-wheel drive state, or after the synchromesh mechanism 54 is forced to assume the connected state by the transfer switching control means 132 as described below, the count value CNT is reset (set to an initial value of zero).

A count value determination portion, that is, count value determination means 140, determines whether or not, for example, the count value CNT obtained by the two-wheel drive state counting means 138 is equal to or greater than the predetermined value CNT'. At this time, the count value determination means 140 may serially calculate an average value of the engine rotation speed $N_E$, for example, during the travel of the vehicle 10 in the two-wheel drive state, and may serially calculate a predetermined value CNT' from the calculated average value of the engine rotation speed $N_E$ on the basis of, for example, a relation (predetermined-value map) as shown in FIG. 4.

For example, if it is determined by the count value determination means 140 that the count value CNT has become equal to or greater than the predetermined value CNT', the transfer switching control means 132 outputs to the shift actuator 84 the drive state-switching control command signal $S_{2-4}$ for forcing the state of drive in the transfer 24 to be switched to the four-wheel drive state even when the operation position $P_{DIAL}$ of the drive state-switching dial switch 122 is such that usually the signal representing the two-wheel drive state (H-2WD) is generated, so that the shift actuator 84 periodically forces the synchromesh mechanism 54 to assume the connected state, via the second shift fork shaft 100. Besides, for example, if it is determined via switch time elapse determination means 142 that a predetermined switch time T4wd' has elapsed, the transfer switching control means 132 outputs to the shift actuator 84 the drive state-switching control command signal $S_{2-4}$ for switching the state of drive in the transfer 24 to the two-wheel drive state, so that the shift actuator 84 puts the synchromesh mechanism 54 into the disconnected state, via the second shift fork shaft 100.

A switch time elapse determination portion, that is, switch time elapse determination means 142, determines whether or not the switch time T4wd during which the state of drive in the transfer 24 has been forced to be switched and held to the four-wheel drive state by the transfer switching control means 132 even though the operation position $P_{DIAL}$ is such that the signal representing the two-wheel drive state (H-2WD) is usually generated, and therefore the signal sent from the drive state-detecting switch 124 has been switched and held to the signal that represents the four-wheel drive state $S_{4WD}$ has reached or exceeded a predetermined switch time T4wd'. The predetermined switch time T4wd' is a forced four-wheel drive state switch time that is empirically found and set beforehand as a time for appropriately securing the lubricating performance due to the oil OIL splashed upward by rotation of the driven gear 62 and the chain 64 which is achieved by temporarily switching the state of drive in the transfer 24 to the four-wheel drive state.

Figure 5:
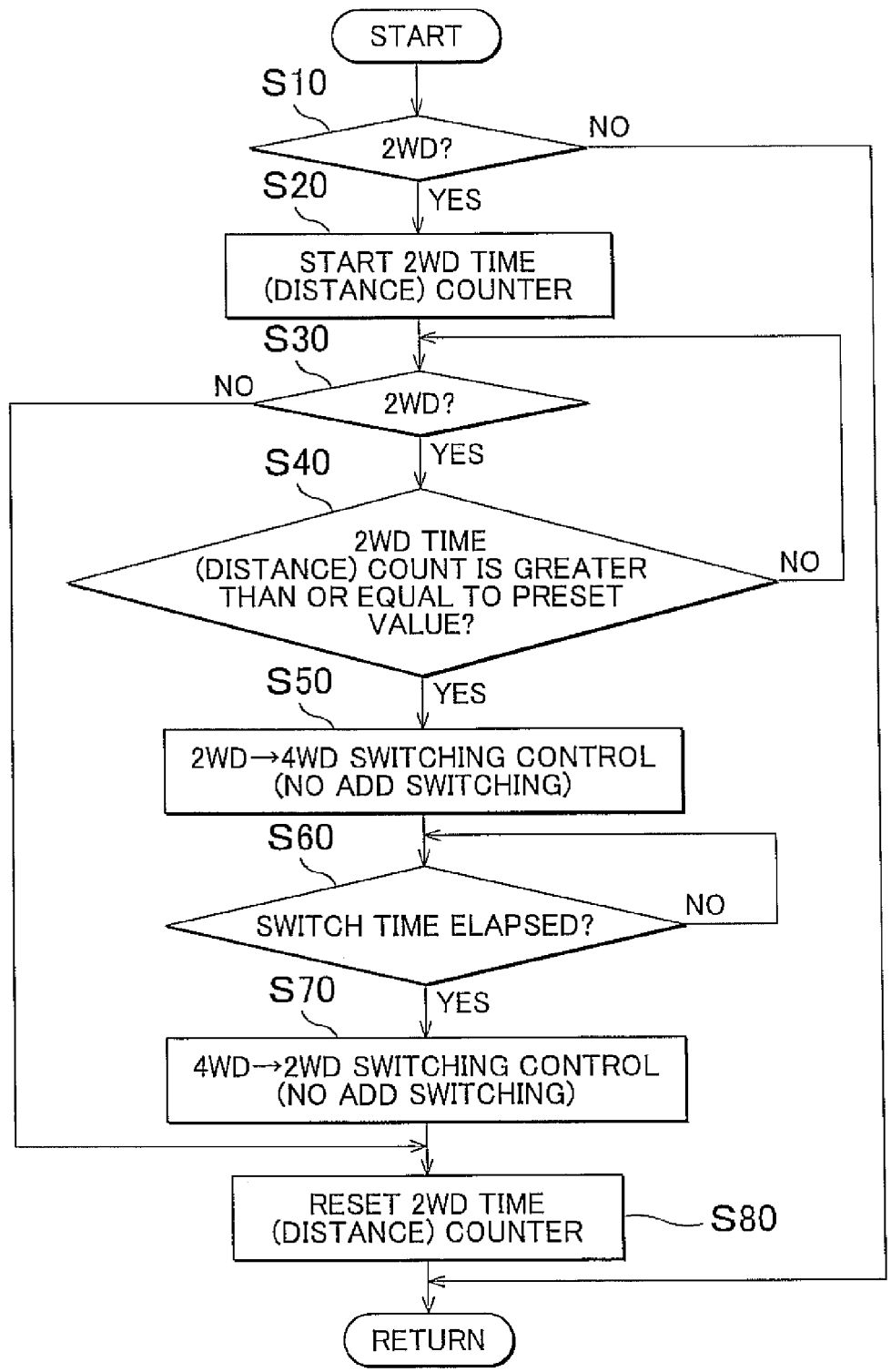
FIG. 5 is a flowchart illustrating portions of control operations of the electronic control unit, that is, a control operation for improving durability by restraining the partial wear of rotary members that do not rotate when the vehicle is in a two-wheel drive state.

FIG. 5 is a flowchart illustrating portions of control operations of the electronic control unit 130, that is, a control operation for improving durability by restraining the partial wear of rotary members that do not rotate during the two-wheel drive state, such as the second output shaft 60 and the like. This control operation is repeatedly executed in a very short cycle time of, for example, several milliseconds to several ten milliseconds.

In FIG. 5, firstly in step S10 (hereinafter, the term "step" will be omitted) that corresponds to the drive state determination means 136, it is determined whether or not the present state of drive in the transfer 24 is the two-wheel drive state, on the basis of, for example, the signals representing the two-wheel drive state $S_{2WD}$ and the four-wheel drive state $S_{4WD}$ detected by the drive state-detecting switch 124. If the determination in S10 is negative, the present routine is ended. If the determination in S10 is affirmative, the counting of the reference pulses for outputting a count value CNT concerning the travel in, for example, the two-wheel drive state, is started in S20, which corresponds to the two-wheel drive state counting means 138. Concretely, the counting of the reference pulse for finding the cumulative travel time (2WD time count) CNT-T or the cumulative travel distance (2WD distance count) CNT-D in the two-wheel drive state is started. Next, in S30, which corresponds to the drive state determination means 136, it is determined whether or not, for example, the present state of drive is the two-wheel drive state, as in S10. If the determination in S30 is affirmative, it is then determined in S40, which corresponds to the count value determination means 140, whether or not, for example, the count value CNT (the 2WD time count CNT-T or the 2WD distance count CNT-D) has become equal to or greater than a predetermined value CNT' (a predetermined time count value CNT-T' or a predetermined distance count value CNT-D'). The predetermined value CNT' may be, for example, a constant value, or may also be a predetermined value CNT' that is serially calculated from the average value of the engine rotation speed $N_E$ during the travel in the two-wheel drive state by using a map as shown in FIG. 4. If the determination in S40 is negative, the process returns to S30. If the determination in S40 is affirmative, the process proceeds to S50, which corresponds to the transfer switching control means 132. In 850, for example, even if the operation position $P_{DIAL}$ is such as to usually generate the signal that represents the two-wheel drive state (H-2WD), the drive state-switching control command signal $S_{2-4}$ for forcing the state of drive in the transfer 24 to be switched to the four-wheel drive state is output to the shift actuator 84, so that the shift actuator 84 forces the synchromesh mechanism 54 to enter the connected state via the second shift fork shaft 100. In this case, the state of drive in the transfer 24 is forced to switch to the four-wheel drive state, but the operation position $P_{DIAL}$ remains such as to usually generate the signal that represents the two-wheel drive state (H-2WD), so the switching of the mesh clutch 38 (the ADD device 110) is not performed, but the mesh clutch 38 remains in the disconnected state. Therefore, the vehicle 10, in effect, remains in the two-wheel drive state, so that deterioration of efficiency is restrained and changes in the vehicle behavior caused by switching the vehicle 10 into the four-wheel drive state in effect are avoided. Next, in S60, which corresponds to the switch time elapse determination means 142, it is determined whether or not the switch time T4wd during which the signal from the drive state-detecting switch 124 has been switched and held to the signal that represents the four-wheel drive state $S_{4WD}$ has reached or exceeded the predetermined switch time T4wd'. If the determination in S60 is negative, the process of S60 is repeated. If the determination in S60 is affirmative, the process proceeds to S70, which corresponds to the transfer switching control means 132. In S70, for example, the drive state-switching control command signal $S_{2-4}$ for switching the state of drive in the transfer 24 to the two-wheel drive state is output to the shift actuator 84, so that the synchromesh mechanism 54 is put into the disconnected state via the second shift fork shaft 100. In this case, the state of drive in the transfer 24 that has been forced to switch to the four-wheel drive state is switched back to the two-wheel drive state. Therefore, because the switching of the mesh clutch 38 (the ADD device 110) has not been performed, the switching of the mesh clutch 38 (the ADD device 110) is not performed in this step either, but the mesh clutch 38 remains in the disconnected state. If the determination in S30 is negative, or after S70 is executed, the count value CNT is reset (set to the initial value of zero) in S80, which corresponds to the two-wheel drive state counting means 138.

As described above, according to the embodiment, when the count value CNT concerning the travel in the two-wheel drive state becomes equal to or greater than the predetermined value CNT', at least one of the synchromesh mechanism 54 and the mesh clutch 38 is put into the connected state for a temporary switch to the four-wheel drive state. Therefore, the rotary members that do not rotate, for example, during the two-wheel drive state, such as the second output shaft 60 and the like, are temporarily rotated, so that the contact of the rotary members at fixed portions is restrained. Hence, the partial wear of the rotary members that do not rotate during the two-wheel drive state is restrained, so that durability can be improved.

Besides, there is no need to provide a mechanism for temporarily rotating the rotary members, such as the second output shaft 60, separately from the mechanisms that are normally provided for the travel of the vehicle in the four-wheel drive state in the related art. Therefore, it is possible to improve durability without involving drawbacks of cost increase, space efficiency deterioration, etc.

Besides, for example, if a construction in which the oil OIL gathering in the lower portion of the transfer case 42 is splashed upward by rotation of rotary members, for example, the driven gear 62, the chain 64, etc., is adopted, the oil OIL can be splashed upward by temporarily rotating the rotary members, such as the driven gear 62, the chain 64, etc., so that the oil lubrication of the rotary members that do not rotate during the two-wheel drive state can be appropriately secured, and so that the partial wear of the rotary members can be further restrained and therefore the durability can be further improved. In this case, since there is no need to increase the amount of oil, it is possible to improve the durability without involving drawbacks, such as deteriorated efficiency caused by increased stirring resistance due to an increase in the amount of oil, or the like.

Furthermore, in the invention, when the foregoing switch to the four-wheel drive state is performed, the disconnected state of one of the synchromesh mechanism 54 and the mesh clutch 38 is maintained, so that the vehicle 10 as a whole remains in the two-wheel drive state in effect. Therefore, the deterioration of efficiency can be restrained, and the changes in the vehicle behavior caused by switching the vehicle into the four-wheel drive state in effect can be avoided.

Besides, according to the embodiment, when the count value CNT concerning the travel in the two-wheel drive state becomes equal to or greater than the predetermined value CNT', only the state of drive in the transfer 24 is switched to the four-wheel drive state by putting only the synchromesh mechanism 54 into the connected state, without switching the mesh clutch 38 (the ADD device 110), that is, while keeping the mesh clutch 38 in the disconnected state. Therefore, for example, by putting only the synchromesh mechanism 54 into the four-wheel drive state, the rotary members that do not rotate during the two-wheel drive state, such as second output shaft 60 and the like, are certainly rotated without transmitting power to the front wheels 14.

Besides, according to the embodiment, the synchromesh mechanism 54 is a power connection/disconnection device that is equipped with a synchromesh mechanism, and the mesh clutch 38 is a power connection/disconnection device that is not equipped with a synchromesh mechanism. Therefore, for example, in a four-wheel drive vehicle in which the mesh clutch 38 is not equipped with a synchromesh mechanism and therefore it is difficult to rotate the second output shaft 60 from the side of the front wheels 14 through the driving connection with the front wheels 14 by putting only the mesh clutch 38 into the connected state during the travel of the vehicle, the embodiment makes it possible to improve the durability by restraining the partial wear of the rotary members that do not rotate during the two-wheel drive state. Besides, since the mesh clutch 38 is not equipped with a synchromesh mechanism, for example, the construction of the mesh clutch 38 can be a simple one, thus improving the cost cut, the space utility, etc.

According to this embodiment, the count value CNT concerning the travel in the two-wheel drive state is the cumulative travel time CNT-T or the cumulative travel distance CNT-D during the two-wheel drive state, so that the state of drive can be temporarily switched to the four-wheel drive state at an appropriate timing (time) such that the fixed-portion contact of the rotary members that do not rotate during, for example, the two-wheel drive state, is restrained.

Besides, according to the embodiment, the count value CNT concerning the travel in the two-wheel drive state is an accumulated value of count values that are obtained when the engine rotation speed $N_E$ is greater than or equal to the predetermined rotation speed $N_E'$. Therefore, it is possible to take a countermeasure as described below against the problem in which as the rotation vibration of the engine 12 that is a source of vibration that causes the striking wear or the like increases with, for example, increases in the engine rotation speed $N_E$, it becomes more likely that the local striking wear and the like of rotary members that do not rotate during the two-wheel drive state, such as the second output shaft 60 and the like, will progress. That is, in the countermeasure, when the engine rotation speed NE is greater than or equal to the predetermined engine rotation speed NE' and therefore the foregoing striking wear and the like are likely to progress, the state of drive is temporarily switched to the four-wheel drive state in an appropriate manner, depending on the then accumulated value of count values mentioned above. In other words, because the switching to the four-wheel drive state is not carried out on the basis of an accumulated value obtained when the engine rotation speed $N_E$ is less than the predetermined rotation speed $N_E'$ and therefore the progress of the striking wear and the like is unlikely, it is possible to restrain the efficiency deterioration caused by the temporary switching to the four-wheel drive state.

Besides, according to the embodiment, the higher the engine rotation speed $N_E$, the smaller the predetermined value CNT' is made. Therefore, in conjunction with the problem in which as the rotation vibration of the engine 12 that is a source of vibration that causes the striking wear or the like increases with, for example, increases in the engine rotation speed $N_E$, it becomes more likely that the local striking wear and the like of rotary members that do not rotate during the two-wheel drive state, such as the second output shaft 60 and the like, will progress, it is possible to cause the temporary switch to the four-wheel drive state to be performed more readily the higher the engine rotation speed $N_E$.

While an embodiment of the invention has been described in detail above with reference to the drawings, it is to be understood that the invention is also applicable in other forms as well.

For example, although in the foregoing embodiment, only the state of drive in the transfer 24 is temporarily switched to the four-wheel drive state by putting only the synchromesh mechanism 54 into the connected state when the count value CNT concerning the travel in the two-wheel drive state becomes equal to or greater than the predetermined value CNT', this manner of operation is not essential. For example, it is also permissible to put only the mesh clutch 38 into the connected state if the mesh clutch 38 is equipped with a synchromesh mechanism. Besides, it is also permissible to temporarily switch to the ordinary four-wheel drive state by putting both the synchromesh mechanism 54 and the mesh clutch 38 into the connected state. In short, the invention is applicable to any construction as long as the state of drive is temporarily switched to the four-wheel drive state by putting at least one of the synchromesh mechanism 54 and the mesh clutch 38 into the connected state when the count value CNT concerning the travel in the two-wheel drive state becomes equal to or greater than the predetermined value CNT'. In such constructions, it is possible to achieve a certain degree of effect of improving durability by restraining the partial wear of the rotary members that do not rotate during the two-wheel drive state, as in the foregoing embodiment. Besides, other effects can also be achieved, including improvement of the durability without involving drawbacks of cost increase, space efficiency deterioration, etc., appropriate securement of oil lubrication, improvement of the durability without involving drawbacks of efficiency deterioration due to increased stirring resistance involved with an increase in the amount of oil, and the like, restraint of efficiency deterioration, and avoidance of changes in the vehicle behavior caused by the switching to the four-wheel drive state in effect.

Besides, in the foregoing embodiment, the predetermined switch time T4wd' as a duration for which the state of drive in the transfer 24 is forced to be switched and held to the four-wheel drive state is such as to appropriately secure the lubricating performance achieved by the oil OIL being splashed by rotation of the driven gear 62 and the chain 64. However, it is not altogether necessary to intend to improve the lubricating performance by splashing the oil OIL upward. For example, it suffices that by forcing the state of drive in the transfer 24 to switch to the four-wheel drive state, the rotary members that do not rotate during the two-wheel drive state, such as the second output shaft 60 and the like, are temporarily rotated, so that the contact of the rotary members at fixed portions (e.g., contact between the second output shaft 60 and the bearings 56 and 58) is restrained. That is, the duration for which the state of drive in the transfer 24 is forced to be switched to the four-wheel drive state may be much shorter than the predetermined switch time T4wd' set for appropriately securing the lubricating performance. In another view, the power transmitted to the second output shaft 60 when the state of drive of the transfer 24 is forced to switch to the four-wheel drive state may be smaller than the power needed for splashing the oil OIL upward by rotation of the rotary members that do not rotate during the two-wheel drive state. That is, the power transmitted to the second output shaft 60 when the state of drive in the transfer 24 is forced to switch to the four-wheel drive state does not need to be as large as the power needed for splashing the oil OIL upward, but may appropriately be as large as the power needed for temporarily rotating the rotary members, for example, the second output shaft 60 and the like, so that at least the foregoing contact at fixed portions is restrained. In this manner, too, it is possible to achieve a certain degree of effect of improving the durability by restraining the partial wear of the rotary members that do not rotate during the two-wheel drive state, such as the second output shaft 60 and the like. Besides, it is also possible to restrain the efficiency deterioration caused by the oil OIL being splashed upward by rotation of the rotary members that do not rotate during the two-wheel drive state, such as the second output shaft 60 and the like. Besides, it is also possible to achieve the effects of improving the durability without involving drawbacks of cost increase, space efficiency deterioration, etc., and restraining efficiency deterioration and avoiding changes in the vehicle behavior caused by the switching to the four-wheel drive state in effect. Incidentally, in the synchromesh mechanism 54, the power transmitted to the second output shaft 60 can be made smaller than the power needed for splashing the oil OIL upward by rotation of the rotary members, such as the second output shaft 60 and the like, by, for example, stopping the movement of the sleeve 90 toward the clutch gear 92 during a transitional state in which the inner peripheral teeth of the sleeve 90 and the outer peripheral teeth of the synchronizer ring 94 are in contact with each other before the sleeve 90 and the clutch gear 92 mesh in an action of the synchromesh mechanism 54, and then moving the sleeve 90 back to a side opposite the clutch gear 92 side.

Besides, the foregoing embodiment is an embodiment in which the invention is applied to the vehicle 10 equipped with the transfer 24 that has the synchromesh mechanism 54 that is a Warner-type synchronous mesh device that is equipped with a single synchronizer ring 94 and performs a synchronous action using the synchronizer ring 94. However, this does not limit the invention; that is, the invention is suitably applicable to four-wheel drive vehicles equipped with a transfer that has a constant-load type synchronous mesh device or a so-called multi-cone synchromesh mechanism that is made up of an outer synchronizer ring and an inner synchronizer ring that each have a cone surface (tapered surface) as well as a middle ring that is disposed between the outer and inner synchronizer rings and that has tapered surfaces that slide respectively on the tapered surfaces of the synchronizer rings, etc.

Besides, in the foregoing embodiment, the invention is applied to the synchromesh mechanism 54 of a type in which the sleeve 90 is moved in the direction along the axis by the second shift fork shaft 100 that is mechanically moved in the left and right directions by driving the shift actuator 84. However, the invention can be suitably applied to a type of transfer that performs a switching control by moving the sleeve 90 in the axis direction by a drive device such as a hydraulic actuator or the like.

Besides, in the foregoing embodiment, the invention is applied to the vehicle 10 whose basic arrangement is a front-mounted engine rear-wheel drive (FR) arrangement, more specifically, the vehicle 10 whose rear wheels 16 are the main driving wheels and whose front wheels 14 are auxiliary driving wheels. However, the invention can also be suitably applied to a four-wheel drive vehicle whose basic arrangement is a front-mounted engine front wheel drive (FF) arrangement, that is, a vehicle whose front wheels 14 are the main driving wheels and whose rear wheels 16 are auxiliary driving wheels. In short, the invention is suitably applicable to any four-wheel drive vehicle of a so-called part-time 4WD type that is capable of switching between the two-wheel drive state and the four-wheel drive state.

Besides, the foregoing embodiment is mere an embodiment, and the invention can also be carried out with various modifications and improvements on the basis of the knowledge of a person having ordinary skill in the art.

What is claimed is:

1. A control apparatus for a four-wheel drive vehicle that is capable of switching a state of drive between a two-wheel drive state in which the vehicle travels by transmitting power provided by a drive force source only from a main drive shaft to main driving wheels and a four-wheel drive state in which the vehicle travels by transmitting the power to the main driving wheels, and also by transmitting the power from the main drive shaft to an auxiliary drive shaft by putting into a connected state a first power connection/disconnection device capable of connecting and disconnecting a power transmission path between the main drive shaft and the auxiliary drive shaft, and by transmitting the power from the auxiliary drive shaft to auxiliary driving wheels by putting into the connected state a second power connection/disconnection device capable of connecting and disconnecting a power transmission path between the auxiliary drive shaft and the auxiliary driving wheels, the control apparatus comprising a control portion that puts both the first power connection/disconnection device and the second power connection/disconnection device into a disconnected state when the state of drive is switched to the two-wheel drive state, the control portion temporarily switches only one of the first power connection/disconnection device and the second power connection/disconnection device into the connected state when a count value concerning a travel of the vehicle in the two-wheel drive state becomes equal to or greater than a predetermined value.

2. The control apparatus according to claim 1, wherein:
   the four-wheel drive vehicle has a construction in which an oil for lubrication is splashed upward by rotation of the auxiliary drive shaft; and
   the power that is transmitted to the auxiliary drive shaft, when the control portion temporarily switched only one of the first power connection/disconnection device and the second power connection/disconnection device into the connected state when the count value concerning the travel of the vehicle in the two-wheel drive state becomes equal to or greater than the predetermined value, is smaller than the power for splashing the oil upward by rotation of the auxiliary drive shaft.

3. The control apparatus according to claim 1, wherein when the count value concerning the travel in the two-wheel drive state becomes equal to or greater than the predetermined value, the state of drive is temporarily switched by putting the first power connection/disconnection device into the connected state while maintaining the disconnected state of the second power connection/disconnection device.

4. The control apparatus according to claim 3, wherein:
   the first power connection/disconnection device is a power connection/disconnection device that includes a synchromesh mechanism; and
   the second power connection/disconnection device is a power connection/disconnection device that does not include a synchromesh mechanism.

5. The control apparatus according to claim 1, wherein the count value concerning the travel in the two-wheel drive state is a cumulative travel time in the two-wheel drive state or a cumulative travel distance in the two-wheel drive state.

6. The control apparatus according to claim 5, wherein the count value concerning the travel in the two-wheel drive state is an accumulated value obtained when a value related to rotation speed of the drive force source is greater than or equal to a predetermined rotation speed.

7. The control apparatus according to claim 1, wherein the predetermined value is reduced with increases in a value related to rotation speed of the drive force source.

8. A four-wheel drive vehicle that is capable of switching a state of drive between a two-wheel drive state in which the vehicle travels by transmitting power provided by a drive force source only from a main drive shaft to main driving wheels and a four-wheel drive state in which the vehicle travels by transmitting the power to the main driving wheels, and also by transmitting the power from the main drive shaft to an auxiliary drive shaft by putting into a connected state a first power connection/disconnection device capable of connecting and disconnecting a power transmission path between the main drive shaft and the auxiliary drive shaft, and by transmitting the power from the auxiliary drive shaft to auxiliary driving wheels by putting into the connected state a second power connection/disconnection device capable of connecting and disconnecting a power transmission path between the auxiliary drive shaft and the auxiliary driving wheels, the four-wheel drive vehicle comprising a control apparatus that puts both the first power connection/disconnection device and the second power connection/disconnection device into a disconnected state when the state of drive is switched to the two-wheel drive state, a control portion temporarily switches only one of the first power connection/disconnection device and the second power connection/disconnection device into the connected state when a count value concerning a travel of the vehicle in the two-wheel drive state becomes equal to or greater than a predetermined value.

9. A method of controlling a four-wheel drive vehicle, the method comprising:
   switching a state of drive between a two-wheel drive state in which the vehicle travels by transmitting power provided by a drive force source only from a main drive shaft to main driving wheels and a four-wheel drive state in which the vehicle travels by transmitting the power to the main driving wheels, and also by transmitting the power from the main drive shaft to an auxiliary drive shaft by putting into a connected state a first power connection/disconnection device capable of connecting and disconnecting a power transmission path between the main drive shaft and the auxiliary drive shaft, and by transmitting the power from the auxiliary drive shaft to auxiliary driving wheels by putting into the connected state a second power connection/disconnection device capable of connecting and disconnecting a power transmission path between the auxiliary drive shaft and the auxiliary driving wheels, wherein both the first power connection/disconnection device and the second power connection/disconnection device are put into a disconnected state when the state of drive is switched to the two-wheel drive state;

detecting a count value concerning a travel of the vehicle in the two-wheel drive state; and temporarily switching only one of the first power connection/disconnection device and the second power connection/disconnection device into the connected state when the count value becomes equal to or greater than a predetermined value.

* * * * *